United States Patent
Lin et al.

(10) Patent No.: US 11,461,317 B2
(45) Date of Patent: Oct. 4, 2022

(54) METHOD, APPARATUS, SYSTEM, DEVICE, AND STORAGE MEDIUM FOR ANSWERING KNOWLEDGE QUESTIONS

(71) Applicant: ALIPAY (HANGZHOU) INFORMATION TECHNOLOGY CO., LTD., Zhejiang (CN)

(72) Inventors: Xiexiong Lin, Hangzhou (CN); Jianshan He, Hangzhou (CN); Taifeng Wang, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/359,578

(22) Filed: Jun. 27, 2021

(65) Prior Publication Data

US 2022/0004547 A1   Jan. 6, 2022

(30) Foreign Application Priority Data

Jul. 3, 2020   (CN) .......................... 202010632352.4

(51) Int. Cl.
  *G06F 16/00*  (2019.01)
  *G06F 16/245*  (2019.01)
  (Continued)

(52) U.S. Cl.
  CPC .......... *G06F 16/245* (2019.01); *G06F 16/285* (2019.01); *G06F 40/30* (2020.01)

(58) Field of Classification Search
  CPC ..................................................... G06F 16/245
  (Continued)

(56) References Cited

U.S. PATENT DOCUMENTS 8,386,405 B2   2/2013   Antebi et al.
9,495,331 B2   11/2016   Govrin et al.
(Continued)

FOREIGN PATENT DOCUMENTS

CN   107766483 A   3/2018
CN   107798123 A   3/2018
(Continued)

OTHER PUBLICATIONS

First Search for Chinese Application No. 202010632352.4 mailed on Aug. 18, 2020.
(Continued)

*Primary Examiner* — Alexandria Y Bromell (57) ABSTRACT

Embodiments of the present specification disclose a method, an apparatus, a system, a device, and a storage medium for answering user questions, including: obtaining a user question; encoding the user question and a schema level of pre-constructed structured data to obtain a first feature vector, wherein the structured data further comprises a data level, wherein the data level comprises knowledge for answering questions structured according to the schema level; retrieving one or more candidate sub-graphs related to the user question from the structured data; encoding the one or more candidate sub-graphs to obtain a second feature vector; performing multi-task classification for the user question based on the first feature vector and the second feature vector; and obtaining answer content for the user question based on a result of the multi-task classification.

18 Claims, 2 Drawing Sheets

(51) Int. Cl.
*G06F 16/28* (2019.01)
*G06F 40/30* (2020.01)
(58) Field of Classification Search
USPC .......................................................... 707/769
See application file for complete search history.

(56) References Cited

U.S. PATENT DOCUMENTS

| | | | |
|---|---|---|---|
| 9,720,981 | B1 | 8/2017 | Boguraev et al. |
| 9,940,323 | B2 | 4/2018 | Boyer et al. |
| 10,262,062 | B2 | 4/2019 | Chang et al. |
| 10,878,197 | B2 | 12/2020 | Yin et al. |
| 2013/0144605 | A1 | 6/2013 | Brager et al. |
| 2014/0358890 | A1 | 12/2014 | Chen et al. |
| 2016/0155439 | A1 | 6/2016 | Bangalore et al. |
| 2016/0299975 | A1* | 10/2016 | Acar ................. G06F 16/24569 707/707 |
| 2017/0076206 | A1* | 3/2017 | Lastras-Montano ........................ G06F 16/3344 707/707 |
| 2018/0131645 | A1 | 5/2018 | Magliozzi et al. |
| 2018/0260472 | A1 | 9/2018 | Kelsey et al. |
| 2019/0042988 | A1* | 2/2019 | Brown .................. G06N 5/022 707/707 |
| 2019/0103111 | A1 | 4/2019 | Tiwari et al. |
| 2019/0179903 | A1 | 6/2019 | Terry et al. |
| 2020/0042642 | A1* | 2/2020 | Bakis ...................... G06F 40/35 707/707 |
| 2020/0042649 | A1* | 2/2020 | Bakis ...................... G06N 20/00 707/707 |
| 2020/0143247 | A1 | 5/2020 | Jonnalagadda et al. |
| 2020/0160199 | A1 | 5/2020 | Al Hasan et al. |
| 2021/0334671 | A1* | 10/2021 | Minsky ............... G06F 16/3329 707/707 |

FOREIGN PATENT DOCUMENTS

| | | |
|---|---|---|
| CN | 109033229 A | 12/2018 |
| CN | 109726274 A | 5/2019 |
| CN | 110110054 A | 8/2019 |

OTHER PUBLICATIONS

Bao, "Research on Knowledge-based Question Answering and Question Generation," Harbin Institute of Technology, Dec. 31, 2019.

Annamoradnejad et al., "Predicting Subjective Features from Questions on QA Websites using BERT," ResearchGate, Feb. 29, 2020.

\* cited by examiner

Knowledge graph          Candidate sub-graph

METHOD, APPARATUS, SYSTEM, DEVICE, AND STORAGE MEDIUM FOR ANSWERING KNOWLEDGE QUESTIONS

CROSS-REFERENCE TO RELATED APPLICATIONS

This application is based upon and claims priority to and benefits of Chinese Patent Application No. 202010632352.4, filed on Jul. 3, 2020. The content of the above identified application is incorporated herein by reference in its entirety.

TECHNICAL FIELD

Embodiments of the present specification relate to natural language processing technologies, and in particular, to a method, an apparatus, a system, a device, and a storage medium for answering user questions.

BACKGROUND

A Question Answering System (QA) is an advanced form of information retrieval systems, which can use an accurate and concise natural language to answer questions from users in a natural language. The Question Answering System is a research direction in the field of artificial intelligence and natural language processing that has attracted lots of attentions and has broad development prospects. At present, the Question Answering System has received great attentions in many scenarios in the industrial world, has a great application value, and is also an important scenario where artificial intelligence can be used in businesses. Companies have a great demand for a question answering system in many business scenarios, while the quality of answers determines the level of product intelligence services to a certain extent and affects user experience. Improving capabilities of the question answering system and improving the quality of answers will help improve user experience in using products intelligently, which has a great value.

SUMMARY

The embodiments of the present specification provide a method, an apparatus, a system, a device, and a storage medium for answering user questions, which improve the quality of answers.

In a first aspect, the embodiments of the present specification provide a method for answering knowledge questions, including: obtaining a user question; encoding the user question and a schema level of pre-constructed structured data to obtain a first feature vector, wherein the structured data comprises knowledge for answering questions; retrieving one or more candidate sub-graphs related to the user question from the structured data, and encoding the one or more candidate sub-graphs to obtain a second feature vector; and performing multi-task classification for the user question based on the first feature vector and the second feature vector, obtaining answer content for the user question based on a result of the classification.

In an embodiment, a method for answering user questions comprises: obtaining a user question; encoding the user question and a schema level of pre-constructed structured data to obtain a first feature vector, wherein the structured data further comprises a data level, wherein the data level comprises knowledge for answering questions structured according to the schema level; retrieving one or more candidate sub-graphs related to the user question from the structured data; encoding the one or more candidate sub-graphs to obtain a second feature vector; performing multi-task classification for the user question based on the first feature vector and the second feature vector; and obtaining answer content for the user question based on a result of the multi-task classification.

In an embodiment, the encoding the user question and a schema level of pre-constructed structured data to obtain a first feature vector comprises: constructing a standard input text based on the user question and the schema level; and encoding the standard input text using a self-encoding language model to obtain the first feature vector, wherein the first feature vector contains a vector expression of each element in the user question and a vector expression of each element in the schema level.

In an embodiment, the structured data include a table and a knowledge graph. The constructing a standard input text based on the user question and the schema level comprises: performing structure unification processing on the schema level of the table and the schema level of the knowledge graph to obtain a unified data structure; and constructing a standard input structure based on the unified data structure and the user question to obtain the standard input text.

In an embodiment, the retrieving one or more candidate sub-graphs related to the user question from the structured data comprises: performing content understanding on content of the user question to obtain a topic of the user question; and retrieving, from the structured data, one or more candidate sub-graphs matching the topic of the user question.

In an embodiment, the structured data includes a table and a knowledge graph.

In an embodiment, the retrieving, from the structured data, one or more candidate sub-graphs matching the topic of the user question comprises: for the table, performing knowledge positioning on the table based on the topic of the user question, and positioning to each column whose column name matches the topic of the user question; and for each positioned column whose column name matches the topic of the user question, retrieving a candidate sub-graph using the column name of the column as a center node of the candidate sub-graph and values in the column as adjacent nodes of the center node.

In an embodiment, the retrieving, from the structured data, one or more candidate sub-graphs matching the topic of the user question comprises: for the knowledge graph, performing knowledge positioning on the knowledge graph based on the topic of the user question, and positioning to each topic entity of the knowledge graph corresponding to the topic; and for each positioned topic entity, retrieving a candidate sub-graph using a range of one or more hops of the topic entity.

In an embodiment, the performing multi-task classification for the user question based on the first feature vector and the second feature vector comprises: mapping the user question into a structured query language statement, and dividing the user question into multiple sub-tasks based on the structured query language statement; for each of the multiple sub-tasks, processing the first feature vector and the second feature vector through a corresponding task network in a multi-task classifier to obtain a sub-classification result for the sub-task; and combining sub-classification results of all of the multiple sub-tasks to obtain the result of the multi-task classification.

In a second aspect, the embodiments of the present specification provide an apparatus for answering knowledge questions, including: a question obtaining unit configured to obtain a user question; a first encoding unit configured to encode the user question and a schema level of pre-constructed structured data to obtain a first feature vector, wherein the structured data comprises knowledge for answering questions; a second encoding unit configured to retrieve one or more candidate sub-graphs related to the user question from the structured data, and encode the one or more candidate sub-graphs to obtain a second feature vector; and a classifying unit configured to perform multi-task classification for the user question based on the first feature vector and the second feature vector, and obtain answer content for the user question based on a result of the classification.

In a third aspect, the embodiments of the present specification provide a system for answering knowledge questions, including a client and a server; wherein the client is configured to receive a user question input by a user and send the user question to the server; and the server is configured to receive the user question from the client, encode the user question and a schema level of pre-constructed structured data to obtain a first feature vector, wherein the structured data comprises knowledge for answering questions; retrieve one or more candidate sub-graphs related to the user question from the structured data and encode the one or more candidate sub-graphs to obtain a second feature vector, perform multi-task classification for the user question based on the first feature vector and the second feature vector, and obtain answer content for the user question based on a result of the classification.

In an embodiment, a system for answering user questions comprises: a processor and a non-transitory computer-readable storage medium storing instructions executable by the processor to cause the system to perform operations. The operations comprise: obtaining a user question; encoding the user question and a schema level of pre-constructed structured data to obtain a first feature vector, wherein the structured data further comprises a data level, wherein the data level comprises knowledge for answering questions structured according to the schema level; retrieving one or more candidate sub-graphs related to the user question from the structured data; encoding the one or more candidate sub-graphs to obtain a second feature vector; performing multi-task classification for the user question based on the first feature vector and the second feature vector; and obtaining answer content for the user question based on a result of the multi-task classification.

In a fourth aspect, the embodiments of the present specification provide an electronic device, comprising a memory, a processor, and a computer program stored in the memory and executable on the processor, wherein the processor executes the program to implement steps of the method according to the first aspect.

In a fifth aspect, the embodiments of the present specification provide a computer-readable storage medium on which a computer program is stored, and when executed by a processor, the program implements steps of the method according to the first aspect.

In an embodiment, a non-transitory computer-readable storage medium for answering user questions is configured with instructions executable by one or more processors to cause the one or more processors to perform operations. The operations comprise: obtaining a user question; encoding the user question and a schema level of pre-constructed structured data to obtain a first feature vector, wherein the structured data further comprises a data level, wherein the data level comprises knowledge for answering questions structured according to the schema level; retrieving one or more candidate sub-graphs related to the user question from the structured data; encoding the one or more candidate sub-graphs to obtain a second feature vector; performing multi-task classification for the user question based on the first feature vector and the second feature vector; and obtaining answer content for the user question based on a result of the multi-task classification.

One or more technical solutions provided by the embodiments of the present specification achieve at least the following technical effects or advantages.

The first feature vector is obtained by encoding the user question and a schema level of pre-constructed structured data, the second feature vector is obtained by encoding the one or more candidate sub-graphs related to the user question and retrieved from the structured data, and multi-task classification is performed based on the combination of the first feature vector and the second feature vector to obtain the answer content for the user question. Therefore, manual construction of standard questions and standard answers is avoided, and the establishment of a fixed mapping between standard questions and standard answers is avoided. Therefore, it not only reduces the cost of manual sorting, but also enables users to ask flexible and personalized questions according to actual needs. Richer knowledge is covered by using structured data, rather than just providing users with standard answers constructed manually. Consequently, knowledge can be used more effectively to obtain answers to user questions.

In addition, the first feature vector is constructed through the user question and the schema level of pre-constructed structured data. Since it is combined with the schema level to understand the semantics of the user question, the first feature vector is conducive to accurately selecting one or more candidate sub-graphs that meets the semantics of the user question when performing multi-task classification for locating a answer, thereby increasing the quality of the answer.

BRIEF DESCRIPTION OF THE DRAWINGS

In order to more clearly explain the technical solutions in the embodiments of the present specification or the prior art, the following will briefly introduce the accompanying drawings that need to be used in the description of the embodiments or the prior art. The accompanying drawings in the following description are merely embodiments of the present specification. For those of ordinary skill in the art, other drawings can also be obtained according to the provided drawings without creative efforts.

DETAILED DESCRIPTION

In order to make the objectives, technical solutions, and advantages of the embodiments of the present specification clearer, the technical solutions of the embodiments of the present specification will be clearly and completely described below with reference to the accompanying drawings in the embodiments of the present specification. The embodiments to be described are only some, rather than all, of the embodiments of the present specification. All other embodiments derived by persons of ordinary skill in the art based on the embodiments of the present specification without creative efforts shall fall within the protection scope of the present specification.

Figure 1:
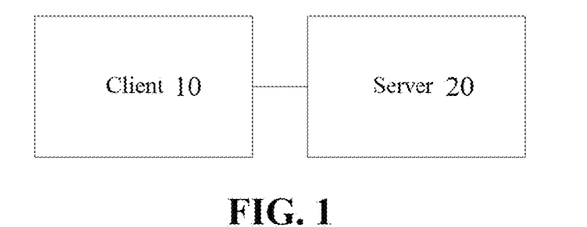
FIG. 1 is a schematic diagram of a scenario of a method for answering user questions in an embodiment of the present specification.

The method for answering user questions provided by the embodiments of the present specification is applied in the scenario shown in FIG. 1, and the scenario includes a client 10 and a server 20. The client 10 is deployed on user equipment. The client 10 receives an input user question and sends the user question to the server 20. Upon receiving the user question sent by the client 10, the server 20 generates answer content for the user question and sends the generated answer content to the client 10, so that the client 10 can provide the answer content to the user.

Figure 2:
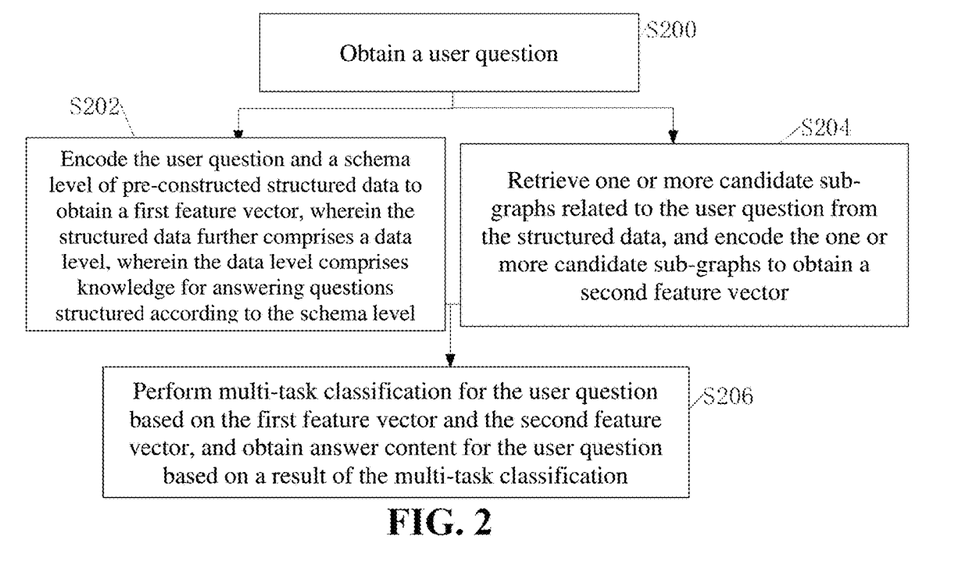
FIG. 2 is a flow chart of a method for answering user questions in an embodiment of the present specification.

In the first aspect, the embodiments of the present specification provide a method for answering user questions, which is applied to the server. As shown in FIG. 1 and FIG. 2, the method for answering user questions provided by the embodiments of the present specification comprises the following steps:

S200. Obtain a user question.

The user question in the embodiments of the present specification includes one or more words. The client receives the input user question and sends the input user question to the server, so that the server obtains the user question.

After the step S200, steps S202 and S204 are executed in parallel or in any order. The present specification does not limit the execution order of steps S202 and S204.

S202. Encode the user question and a schema level of pre-constructed structured data to obtain a first feature vector, wherein the structured data includes a data level, wherein the data level comprises knowledge for answering questions structured according to the schema level.

The pre-constructed structured data contains one or more different forms. If multiple different forms are contained, advantages of different forms of data can be taken into considerations, so that it can be flexibly adapted to more scenarios.

Specifically, the form of the structured data may include a table and/or a knowledge graph. However, regardless of whether it is a table or a knowledge graph, the structured data can be logically divided into a schema level and a data level, wherein the schema level is a structural framework defined for data storage, and the data level contains knowledge for answering questions for specific expression according to the structural framework. On the other hand, the step S202 is a process of processing the schema level of the structured data and has nothing to do with the data level of the structured data.

Specifically, the user question and the schema level of the pre-constructed structured data are encoded by a self-encoding language model to obtain the first feature vector. The self-encoding language model can use, but is not limited to, any one of the bert series models. Based on this, the step S202 includes the following steps S2021 to S2022.

S2021. Construct a standard input text based on the schema level of the structured data and the user question.

Specifically, the schema level contains one or more text objects. The specific implementation process of the step S2021 is: splicing the user question and the schema level to obtain a spliced text; and inserting a start identifier at the beginning position of the spliced text, adding a text separator identifier between the text objects in the spliced text, and adding an end identifier at the end of the spliced text, thereby forming a standard input text that conforms to the input standard of the self-coding language model. Each element in the standard input text is processed to obtain an input expression of each element in the standard input text, wherein the input expression of each element is obtained by splicing a one-dimensional vector (token embeddings), a segment vector (segment embeddings), and a position vector (position embeddings) of the element. In the standard input text, each inserted identifier, each word in the user question, and each word in the schema level is a respective element.

More specifically, if the pre-constructed structured data is in a single form, a standard input structure is constructed directly based on the schema level and the user question to obtain the standard input text. If the form of the pre-constructed structured data includes both a table and a knowledge graph simultaneously, since the structure of the table and the structure of the knowledge graph are not the same (referring to FIG. 3 and FIG. 4, the schema level of the table is a column structure, and the schema level of the knowledge graph is a graph structure formed by edges and entities), and therefore, it is necessary to perform structure unification processing on the schema level of the table and the schema level of the knowledge graph to obtain a unified data structure. Based on the unified data structure and the user question, a standard input structure is constructed to obtain the standard input text.

S2022. Encode the standard input text using a self-encoding language model to obtain a first feature vector, wherein the first feature vector contains a vector expression of each element in the user question and a vector expression of each element in the schema level.

Specifically, the input expression of each element in the standard input text is input into the self-encoding speech model, and the input expression is encoded by the self-encoding language model to obtain a vector expression of the element, thereby extracting the first feature vector of the standard input text.

In the embodiments of the present specification, a shared network layer can be constructed to complete the steps S2021 to S2022, so that the first feature vector can be shared to a task network of different classifiers in the multi-task classifier, which is beneficial to each task network in the multi-task classifier to accurately select one or more candidate sub-graphs to position the answer subsequently.

S204. Retrieve one or more candidate sub-graphs related to the user question from the structured data, and encode the one or more candidate sub-graphs to obtain a second feature vector.

In the embodiments of the present specification, the candidate sub-graphs retrieved from the structured data include one or more candidate sub-graphs. Specifically, by performing content understanding on the content of the user question, a topic of the question is obtained, and one or more candidate sub-graphs matching the topic of the question can be retrieved from the structured data.

Herein, the topic of the question is the core word of the user question. For example, the user question is "which indexes have a 50% increase in the Hu Sheng 300," and by performing content understanding on the content of the user question, a topic of the question, "index," is obtained. Then, one or more candidate sub-graphs matching the topic of the question, "index," are retrieved from the structured data.

In a specific implementation, methods of retrieving candidate sub-graphs is different with respect to different forms of the structured data. Methods for retrieving candidate sub-graphs for the structured data in the form of a table and a knowledge graph are provided below.

Figure 3:
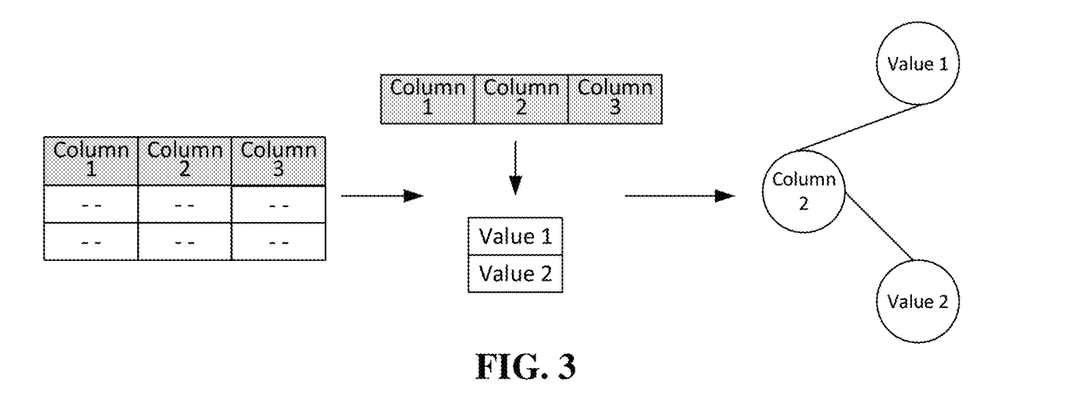
FIG. 3 is a schematic diagram of retrieving a sub-graph from a table in an embodiment of the present specification.

① For structured data in the form of a table, knowledge positioning is performed on the table based on the topic of the question to position to each column whose column name matches the topic of the question. For each positioned column whose column name matches the topic of the question, candidate sub-graphs are retrieved using the column name of the column as a center node and values in the column as adjacent nodes. Therefore, if M columns whose column names match the topic of the question are positioned from the table, M candidate sub-graphs corresponding to the M columns are retrieved from the table, and M is a positive integer.

A column on the table that matches the topic of the question is specified as: the column name of the column contains the topic of the question, or the column name of the column is the same as the topic of the question.

As shown in FIG. 3, if it is positioned from the table that "Column 2" matches the topic of the question, a candidate sub-graph as shown in FIG. 3 can be retrieved with the column name "Column 2" as a central node and values "Value 1" and "Value 2" in the column as corresponding two adjacent nodes.

Figure 4:
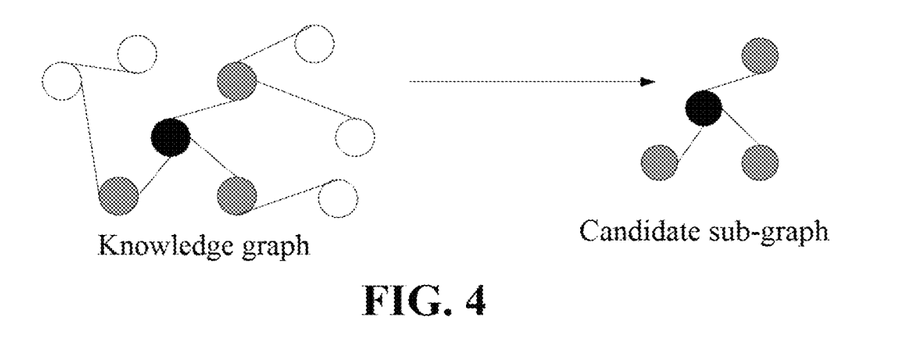
FIG. 4 is a schematic diagram of retrieving a sub-graph from a knowledge graph in an embodiment of the present specification.

② For structured data in the form of a knowledge graph, knowledge positioning is performed on the knowledge graph based on the topic of the question to position to each topic entity on the knowledge graph corresponding to the topic. For each positioned topic entity, candidate sub-graphs are retrieved in a range of one or more hops of the topic entity. Therefore, if N entities matching the topic are positioned in the knowledge graph (i.e., positioned to N topic entities), N candidate sub-graphs corresponding to the N topic entities are retrieved from the knowledge graph, and N is a positive integer.

For example, for each positioned topic entity, candidate sub-graphs are retrieved in a range of one hop or two hops of the topic entity. If sub-graphs are retrieved in a one-hop range of the topic entity, a retrieved candidate sub-graph can be as shown in FIG. 4.

The topic entity on the knowledge graph refers to an entity that contains the topic of the question in the knowledge graph, or an entity that is the same as the topic of the question. In summary, the topic entity is the core word mentioned in the user question. For example, if the topic of the question is "index," entities "composite index," "scale index," "style index," and "exponential function" positioned in the knowledge graph are all topic entities. Here, since sub-graphs can be retrieved based on the topic of the question, the retrieved candidate sub-graphs corresponding to these topic entities may include some candidate sub-graphs that are not consistent with the semantics of the user question. The first feature vector is generated through the self-encoded speech model based on the schema level of the structured data and the user question. Since it is combined with the schema level for semantic understanding of the user question, the first feature vector is conducive for each task network in the multi-task classifier to subsequently select an accurate candidate sub-graph from the retrieved candidate sub-graphs for positioning an answer, thereby improving the answer accuracy.

Specifically, if a plurality of candidate sub-graphs are retrieved from different forms of the structured data, for example, in the retrieved plurality of candidate sub-graphs, one or more comes from a table and one or more comes from a knowledge graph, then the retrieved candidate sub-graphs are unified on the graph structure, and a graph algorithm is used to encode the candidate sub-graphs of a unified graph structure to obtain the second feature vector. Here, the second feature vector contains the vector expression of each candidate sub-graph.

In a specific implementation, the graph algorithm can select, but is not limited to, a GAT (Graph attention network) model.

S206. Perform multi-task classification for the user question based on the first feature vector and the second feature vector, and obtain answer content for the user question based on a result of the classification.

Specifically, a multi-task classifier is pre-constructed, and the constructed multi-task classifier is composed of a plurality of classifiers of a shared network layer, wherein each classifier is a binary task network to complete corresponding sub-tasks, and the multi-task classifier is to jointly optimize the overall network according to an objective function of each sub-task.

In the embodiments of the present specification, the user question is mapped to a SQL (Structured Query Language) statement. Specifically, a target SQL statement is formatted and divided into a plurality of parts. By learning the user question and filling a learning result into each part of the SQL statement, the SQL statement mapped to the user question is obtained. The SQL statement mapped to the user question is divided into a plurality of sub-tasks. For each sub-task in the plurality of sub-tasks, the first feature vector and the second feature vector are processed through a corresponding task network in the pre-constructed multi-task classifier to obtain a sub-classification result corresponding to the sub-task. All sub-classification results in the multi-task classifier are combined to obtain a result of the classification which is used as a query result of the user question.

In the embodiments of the present specification, the SQL statement obtained by processing and mapping the user question can be expressed as follows: select (v1) from table_x where (v1)=(v3), where content included in each pair of parentheses corresponds to a sub-task. Take the user question "What are the CSI 300 composite index funds?" as an example, by mapping the user question expressed in natural language to a SQL statement, the obtained SQL statement is expressed as: select fund from table_x where composite index='CSI 300.' Then, task division is performed on: select fund from table_x where composite index='CSI 300,' which can be divided into a plurality of sub-tasks, including classification sub-tasks such as whether it is a fund, whether it is a composite index, and whether it is a CSI 300.

Through the embodiments of the present specification, a generalized mapping between user questions and content of answers is formed, which is no longer a fixed mapping of standard questions and answers. Therefore, it does not rely on accumulation of standard questions and standard answers that are sorted manually or on a constructed question model to map an input question. Therefore, user questions can be handled more flexibly, such that a user can ask questions flexibly, and answers of a higher quality can be provided to the user. If the knowledge used by the multi-task classifier comes from a table and a knowledge graph which have their respective advantages and certain differences, the advantages of those two can be taken into account at the same time by answering user questions with combined table and knowledge graph data, the knowledge can be used more effectively, and can be adapted more flexibly to more scenarios for answering questions.

Figure 5:
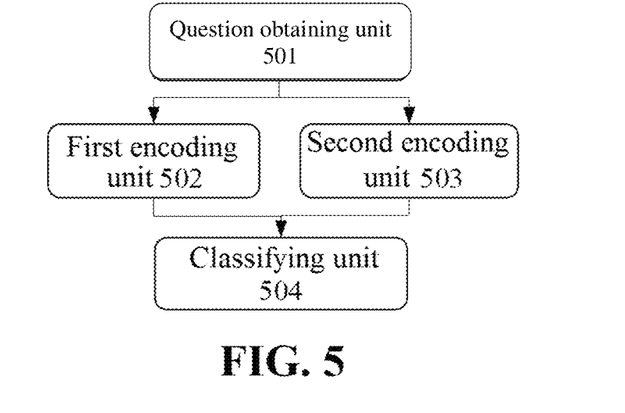
FIG. 5 is a schematic diagram of functional modules of an apparatus for answering user questions in an embodiment of the present specification.

In the second aspect, the embodiments of the present specification provide an apparatus for answering user questions, as shown in FIG. 5, including:

a question obtaining unit 501 configured to obtain a user question;

a first encoding unit 502 configured to encode the user question and a schema level of pre-constructed structured data to obtain a first feature vector, wherein the structured data includes a data level, wherein the data level comprises knowledge for answering questions structured according to the schema level;

a second encoding unit 503 configured to retrieve one or more candidate sub-graphs related to the user question from the structured data, and encode the one or more candidate sub-graphs to obtain a second feature vector; and a classifying unit 504 configured to perform multi-task classification for the user question based on the first feature vector and the second feature vector, and obtain answer content for the user question based on a result of the classification.

In an embodiment, the first encoding unit 502 comprises:

an input constructing sub-unit configured to construct a standard input text based on the user question and the schema level; and an encoding sub-unit configured to encode the standard input text using a self-encoding language model to obtain the first feature vector, wherein the first feature vector contains a vector expression of each element in the user question and a vector expression of each element in the schema level.

In an embodiment, if the form of the structured data includes a table and a knowledge graph, the input constructing sub-unit is specifically configured to:

perform structure unification processing on the schema level of the table and the schema level of the knowledge graph to obtain a unified data structure; and construct a standard input structure based on the unified data structure and the user question to obtain the standard input text.

In an embodiment, the second encoding unit 503 is specifically configured to:

perform content understanding on content of the user question to obtain a topic of the question; and retrieve, from the structured data, one or more candidate sub-graphs matching the topic of the question.

In an embodiment, the form of the structured data includes a table and/or a knowledge graph.

In an implementation manner, the second encoding unit 503 comprises a first sub-graph retrieving sub-unit, and the first sub-graph retrieving sub-unit is configured to:

for the table, perform knowledge positioning on the table based on the topic of the question, and position to each column whose column name matches the topic of the question; and for each positioned column whose column name matches the topic of the question, retrieve a candidate sub-graphs using the column name of the column as a center node of the candidate sub-graph and values in the column as adjacent nodes of the center node.

In an embodiment, the second encoding unit 503 comprises a second sub-graph retrieving sub-unit, and the second sub-graph retrieving sub-unit is configured to:

for the knowledge graph, perform knowledge positioning on the knowledge graph based on the topic of the question, and position to each topic entity of the knowledge graph corresponding to the topic; and for each positioned topic entity, retrieve a candidate sub-graph in a range of one or more hops of the topic entity.

In an embodiment, the classifying unit 504 comprises:

a dividing sub-unit configured to map the user question into a SQL statement and divide the user question into multiple sub-tasks based on the SQL statement;

a classifying sub-unit configured to, for each of the multiple sub-tasks, process the first feature vector and the second feature vector through a corresponding task network in the multi-task classifier to obtain a sub-classification result for the sub-task; and combining sub-classification results of all of the multiple sub-tasks to obtain the result of the classification.

For the above apparatus, the specific functions of each unit thereof have been described in detail in the method embodiment for answering user questions provided in the foregoing embodiments of the present specification. The detailed description in the method embodiment for answering user questions may be referenced to for specific implementation details of the apparatus, which will not be elaborated here for the sake of brevity of the present specification.

In a third aspect, the embodiments of the present specification provide a system for answering user questions, as shown in FIG. 1, comprising: a client 10 and a server 20; wherein the client 10 is configured to receive a user question input by a user and send the user question to the server 20; and the server 20 is configured to receive the user question from the client 10, encode the user question and a schema level of pre-constructed structured data to obtain a first feature vector, wherein the structured data comprises knowledge for answering questions; retrieve one or more candidate sub-graphs related to the user question from the structured data, and encode the one or more candidate sub-graphs to obtain a second feature vector; and perform multi-task classification for the user question based on the first feature vector and the second feature vector, and obtain answer content for the user question based on a result of the classification.

The functions of the above-mentioned system for answering user questions have been described in detail in the foregoing method embodiment for answering user questions provided in the embodiments of the present specification. For the sake of brevity of the present specification, the details will not be elaborated here.

Figure 6:
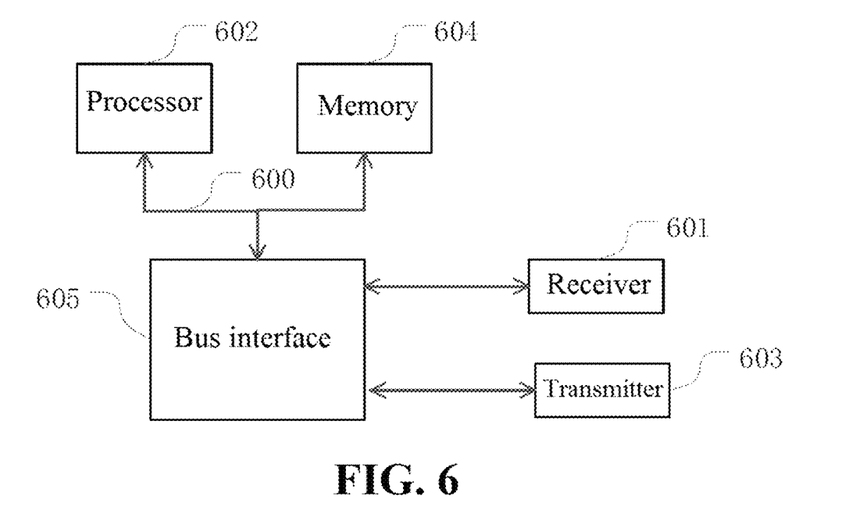
FIG. 6 is a schematic diagram of the structure of an electronic device in an embodiment of the present specification.

In the fourth aspect, based on the same inventive concept as the foregoing method embodiment for answering user questions, the embodiments of the present specification further provide an electronic device, as shown in FIG. 6, comprising a memory 604, a processor 602, and a computer program stored in the memory 604 and executable on the processor 602, wherein the processor 602 executes the program to implement steps of the foregoing method embodiment for answering user questions.

Herein, a bus architecture (represented by a bus 600) is shown in FIG. 6. The bus 600 may include any number of interconnected buses and bridges, and the bus 600 connects various circuits comprising one or more processors represented by the processor 602 and memories represented by the memory 604. The bus 600 can also connect various other circuits such as peripheral devices, voltage regulators, and power management circuits, etc., which are all known in the art, and therefore, no further description thereof will be provided herein. The bus interface 605 provides an interface between the bus 600 and a receiver 601 and a transmitter 603. The receiver 601 and the transmitter 603 may be the same element, that is, a transceiver, which provides a unit for communicating with various other apparatuses on a transmission medium. The processor 602 is responsible for managing the bus 600 and general processing, while the memory 604 may be used to store data used by processor 602 when performing operations.

In the fifth aspect, based on the same inventive concept as the foregoing method embodiment for answering user questions, the embodiments of the present specification further provide a computer-readable storage medium on which a computer program is stored, and when the program is executed by a processor, steps of the aforementioned method embodiment for answering user questions are implemented.

The present specification is described with reference to flow charts and/or block diagrams of the methods, devices (systems), and computer program products according to the embodiments of the present specification. It should be understood that each process in the flow charts and/or each block in the block diagrams and a combination of processes and/or blocks can be realized by computer program instructions. These computer program instructions can be provided to a processor of a general-purpose computer, a special-purpose computer, an embedded processor, or other programmable data processing devices to produce a machine, so that the processor of the computer or other programmable data processing devices that execute the instructions form a device configured to realize the functions specified in one or more processes in the flow charts and/or one or more blocks in the block diagrams.

These computer program instructions can also be stored in a computer-readable memory that can guide a computer or other programmable data processing devices to work in a specific manner, so that the instructions stored in the computer-readable memory produce a product including an instruction device. The instruction device realizes the functions specified in one or more processes in the flow charts and/or one or more blocks in the block diagrams.

These computer program instructions can also be loaded on a computer or other programmable data processing devices, so that a series of operation steps are executed on the computer or other programmable devices to produce computer-implemented processing, such that instructions executed on the computer or other programmable devices provide steps for realizing functions specified in one or more processes in the flow charts and/or one or more blocks in the block diagrams.

The invention claimed is:

1. A method for answering user questions, comprising:
obtaining a user question;
encoding the user question and a schema level of pre-constructed structured data to obtain a first feature vector, wherein the structured data further comprises a data level, a plurality of sub-graphs according to topics of user questions, a table, and a knowledge graph, and wherein the data level comprises knowledge for answering questions structured according to the schema level;
retrieving one or more candidate sub-graphs related to the user question from the plurality of sub-graphs of the structured data, comprises:
performing knowledge positioning on the table based on a topic of the user question, and positioning to each column whose column name matches the topic of the user question; and
for each positioned column whose column name matches the topic of the user question, retrieving a candidate sub-graph having the column name of the column as a center node of the candidate sub-graph and values in the column as adjacent nodes of the center node;
encoding the one or more candidate sub-graphs to obtain a second feature vector;
performing multi-task classification for the user question based on the first feature vector and the second feature vector; and
obtaining answer content for the user question based on a result of the multi-task classification.

2. The method of claim 1, wherein the encoding the user question and a schema level of pre-constructed structured data to obtain a first feature vector comprises:
constructing a standard input text based on the user question and the schema level; and
encoding the standard input text using a self-encoding language model to obtain the first feature vector, wherein the first feature vector contains a vector expression of each element in the user question and a vector expression of each element in the schema level.

3. The method of claim 2, wherein:
the constructing a standard input text based on the user question and the schema level comprises:
performing structure unification processing on the schema level of the table and the schema level of the knowledge graph to obtain a unified data structure; and
constructing a standard input structure based on the unified data structure and the user question to obtain the standard input text.

4. The method according to claim 1, wherein the retrieving one or more candidate sub-graphs related to the user question from the plurality of sub-graphs of the structured data comprises:
performing content understanding on content of the user question to obtain the topic of the user question; and
retrieving, from the plurality of sub-graphs of the structured data, one or more candidate sub-graphs matching the topic of the user question.

5. The method according to claim 4, wherein the retrieving, from the plurality of sub-graphs of the structured data, one or more candidate sub-graphs matching the topic of the user question comprises:
performing knowledge positioning on the knowledge graph based on the topic of the user question, and positioning to each topic entity of the knowledge graph corresponding to the topic; and
for each positioned topic entity, retrieving a candidate sub-graph using a range of one or more hops of the topic entity.

6. The method according to claim 1, wherein the performing multi-task classification for the user question based on the first feature vector and the second feature vector comprises:
mapping the user question into a structured query language statement, and dividing the user question into multiple sub-tasks based on the structured query language statement;
for each of the multiple sub-tasks, processing the first feature vector and the second feature vector through a corresponding task network in a multi-task classifier to obtain a sub- classification result for the sub-task; and
combining sub-classification results of all of the multiple sub-tasks to obtain the result of the multi-task classification.

7. A system for answering user questions, comprising a processor and a non-transitory computer-readable storage medium storing instructions executable by the processor to cause the system to perform operations comprising:
  obtaining a user question;
  encoding the user question and a schema level of pre-constructed structured data to obtain a first feature vector, wherein the structured data further comprises a data level, a plurality of sub-graphs according to topics of user questions, a table, and a knowledge graph, and wherein the data level comprises knowledge for answering questions structured according to the schema level;
  retrieving one or more candidate sub-graphs related to the user question from the plurality of sub-graphs of the structured data, comprises:
    performing knowledge positioning on the table based on a topic of the user question, and positioning to each column whose column name matches the topic of the user question; and
    for each positioned column whose column name matches the topic of the user question, retrieving a candidate sub-graph having the column name of the column as a center node of the candidate sub-graph and values in the column as adjacent nodes of the center node;
  encoding the one or more candidate sub-graphs to obtain a second feature vector;
  performing multi-task classification for the user question based on the first feature vector and the second feature vector; and
  obtaining answer content for the user question based on a result of the multi-task classification.

8. The system of claim 7, wherein the encoding the user question and a schema level of pre-constructed structured data to obtain a first feature vector comprises:
  constructing a standard input text based on the user question and the schema level; and
  encoding the standard input text using a self-encoding language model to obtain the first feature vector, wherein the first feature vector contains a vector expression of each element in the user question and a vector expression of each element in the schema level.

9. The system of claim 8, wherein:
  the constructing a standard input text based on the user question and the schema level comprises:
    performing structure unification processing on the schema level of the table and the schema level of the knowledge graph to obtain a unified data structure; and
    constructing a standard input structure based on the unified data structure and the user question to obtain the standard input text.

10. The system of claim 7, wherein the retrieving one or more candidate sub-graphs related to the user question from the plurality of sub-graphs of the structured data comprises:
  performing content understanding on content of the user question to obtain the topic of the user question; and
  retrieving, from the plurality of sub-graphs of the structured data, one or more candidate sub-graphs matching the topic of the user question.

11. The system of claim 10, wherein
  the retrieving, from the plurality of sub-graphs of the structured data, one or more candidate sub-graphs matching the topic of the user question comprises:
    performing knowledge positioning on the knowledge graph based on the topic of the user question, and positioning to each topic entity of the knowledge graph corresponding to the topic; and
    for each positioned topic entity, retrieving a candidate sub-graph using a range of one or more hops of the topic entity.

12. The system of claim 7, wherein the performing multi-task classification for the user question based on the first feature vector and the second feature vector comprises:
  mapping the user question into a structured query language statement, and dividing the user question into multiple sub-tasks based on the structured query language statement;
  for each of the multiple sub-tasks, processing the first feature vector and the second feature vector through a corresponding task network in a multi-task classifier to obtain a sub-classification result for the sub-task; and
  combining sub-classification results of all of the multiple sub-tasks to obtain the result of the multi-task classification.

13. A non-transitory computer-readable storage medium for answering user questions, configured with instructions executable by one or more processors to cause the one or more processors to perform operations comprising:
  obtaining a user question;
  encoding the user question and a schema level of pre-constructed structured data to obtain a first feature vector, wherein the structured data further comprises a data level, a plurality of sub-graphs according to topics of user questions, a table, and a knowledge graph, and wherein the data level comprises knowledge for answering questions structured according to the schema level;
  retrieving one or more candidate sub-graphs related to the user question from the plurality of sub-graphs of the structured data, comprises:
    performing knowledge positioning on the table based on a topic of the user question, and positioning to each column whose column name matches the topic of the user question; and
    for each positioned column whose column name matches the topic of the user question, retrieving a candidate sub-graph using the column name of the column as a center node of the candidate sub-graph and values in the column as adjacent nodes of the center node;
  encoding the one or more candidate sub-graphs to obtain a second feature vector;
  performing multi-task classification for the user question based on the first feature vector and the second feature vector; and
  obtaining answer content for the user question based on a result of the multi-task classification.

14. The medium of claim 13, wherein the encoding the user question and a schema level of pre-constructed structured data to obtain a first feature vector comprises:
  constructing a standard input text based on the user question and the schema level; and
  encoding the standard input text using a self-encoding language model to obtain the first feature vector, wherein the first feature vector contains a vector expression of each element in the user question and a vector expression of each element in the schema level.

15. The medium of claim 14, wherein:
  the constructing a standard input text based on the user question and the schema level comprises:
    performing structure unification processing on the schema level of the table and the schema level of the knowledge graph to obtain a unified data structure; and constructing a standard input structure based on the unified data structure and the user question to obtain the standard input text.

16. The medium of claim 13, wherein the retrieving one or more candidate sub-graphs related to the user question from the plurality of sub-graphs of the structured data comprises:

performing content understanding on content of the user question to obtain the topic of the user question; and retrieving, from the plurality of sub-graphs of the structured data, one or more candidate sub-graphs matching the topic of the user question.

17. The medium of claim 16, wherein the retrieving, from the plurality of sub-graphs of the structured data, one or more candidate sub-graphs matching the topic of the user question comprises:

performing knowledge positioning on the knowledge graph based on the topic of the user question, and positioning to each topic entity of the knowledge graph corresponding to the topic; and for each positioned topic entity, retrieving a candidate sub-graph using a range of one or more hops of the topic entity.

18. The medium of claim 13, wherein the performing multi-task classification for the user question based on the first feature vector and the second feature vector comprises:

mapping the user question into a structured query language statement, and dividing the user question into multiple sub-tasks based on the structured query language statement;

for each of the multiple sub-tasks, processing the first feature vector and the second feature vector through a corresponding task network in a multi-task classifier to obtain a sub-classification result for the sub-task; and combining sub-classification results of all of the multiple sub-tasks to obtain the result of the multi-task classification.

* * * * *